US00RE41380E

(19) United States
(12) Reissued Patent
McCallister et al.

(10) Patent Number: US RE41,380 E
(45) Date of Reissued Patent: Jun. 15, 2010

(54) CONSTRAINED-ENVELOPE DIGITAL-COMMUNICATIONS TRANSMISSION SYSTEM AND METHOD THEREFOR

(75) Inventors: Ronald D. McCallister, Scottsdale, AZ (US); Bruce A. Cochran, Mesa, AZ (US); Bradley P. Badke, Chandler, AZ (US)

(73) Assignee: Sicom, Inc., Scottsdale, AZ (US)

(21) Appl. No.: 10/718,507

(22) Filed: Nov. 19, 2003

Related U.S. Patent Documents

Reissue of:
(64) Patent No.: 6,104,761
Issued: Aug. 15, 2000
Appl. No.: 09/143,230
Filed: Aug. 28, 1998

(51) Int. Cl.
*H04K 1/02* (2006.01)
*H04L 25/03* (2006.01)
*H04L 25/49* (2006.01)

(52) U.S. Cl. ..... 375/296; 375/261; 375/285; 375/298; 332/103

(58) Field of Classification Search ..... 375/295, 375/296, 298, 300, 302, 308, 377, 285, 259, 375/261, 268, 271, 279, 281, 284, 286, 291; 332/103, 144, 149
See application file for complete search history.

(56) References Cited

U.S. PATENT DOCUMENTS 4,962,510 A 10/1990 McDavid et al.

(Continued)

OTHER PUBLICATIONS

Communication from the European Patent Office dated Nov. 4, 2005 (3 pages).
Communication from the European Patent Office dated May 24, 2006, (5 pages).
Amoroso, Frank and Monzingo, Robert A., "Digital Data Signal Spectral Side Lobe Regrowth in Soft Saturating Amplifiers", *Microwave Journal*, Feb. 1998, pp 126–131.*
Amoroso, Frank and Monzingo, Robert A., "Spectral Side–lobe Regrowth in Saturating Amplifiers", *Applied Microwave and Wireless*, Mar. 1998, pp. 36–42.*
Miller, Scott L. and O'Dea, Robert J., "Adaptive Peak Suppression for Power and Bandwidth Efficient Linear Modulation", IEEE.*

*Primary Examiner*—Jean B Corrielus
(74) *Attorney, Agent, or Firm*—Fogg & Powers LLC

(57) ABSTRACT

A constrained-envelope digital-communications transmitter circuit (22) in which a binary data source (32) provides an input signal stream (34), a phase mapper (44) maps the input signal stream (34) into a quadrature phase-point signal stream (50) having a predetermined number of symbols per unit baud interval (64) and defining a phase point (54) in a phase-point constellation (46), a pulse-spreading filter (76) filters the phase-point signal stream (50) into a filtered signal stream (74), a constrained-envelope generator (106) generates a constrained-bandwidth error signal stream (108) from the filtered signal stream (74), a delay element (138) delays the filtered signal stream (74) into a delayed signal stream (140) synchronized with the constrained-bandwidth error signal stream (108), a complex summing circuit (110) sums the delayed signal stream (140) and the constrained-bandwidth error signal stream (108) into a constrained-envelope signal stream (112), and a substantially linear amplifier (146) amplifies the constrained-envelope signal stream (112) and transmits it as a radio-frequency broadcast signal (26).

26 Claims, 4 Drawing Sheets

U.S. PATENT DOCUMENTS 5,049,832 A 9/1991 Cavers
5,159,608 A * 10/1992 Falconer et al. ..... 375/130
5,287,387 A 2/1994 Birchler
5,313,494 A 5/1994 Park et al.
5,379,322 A 1/1995 Kosaka et al.
5,381,449 A 1/1995 Jasper et al.
5,479,448 A 12/1995 Seshadri
5,548,253 A 8/1996 Durrant
5,559,835 A 9/1996 Betts
5,566,164 A 10/1996 Ohlson
5,579,342 A 11/1996 Crozier
5,600,676 A 2/1997 Ramesh
5,606,578 A 2/1997 O'Dea
5,621,762 A 4/1997 Miller et al.
5,629,961 A 5/1997 Kawabata
5,638,403 A 6/1997 Birchler et al.
5,638,404 A 6/1997 Crozier
5,659,578 A 8/1997 Alamouti et al.
5,696,794 A 12/1997 O'Dea
5,727,026 A 3/1998 Beukema
5,786,728 A 7/1998 Alinikula
5,805,640 A 9/1998 O'Dea et al.
5,987,068 A 11/1999 Cassia et al.
6,072,364 A * 6/2000 Jeckeln et al. ..... 330/149
6,075,411 A * 6/2000 Briffa et al. ..... 330/149
6,097,711 A 8/2000 Okawa et al.
6,141,390 A * 10/2000 Cova ..... 375/297

* cited by examiner

CONSTRAINED-ENVELOPE DIGITAL-COMMUNICATIONS TRANSMISSION SYSTEM AND METHOD THEREFOR

Matter enclosed in heavy brackets [ ] appears in the original patent but forms no part of this reissue specification; matter printed in italics indicates the additions made by reissue.

TECHNICAL FIELD OF THE INVENTION

The present invention relates generally to the field of digital communications. More specifically, the present invention relates to the field of constrained-envelope digital transmitter circuits.

BACKGROUND OF THE INVENTION

A wireless digital communications system should ideally refrain from using any portion of the frequency spectrum beyond that actually required for communications. Such a maximally efficient use of the frequency spectrum would allow the greatest number of communications channels per given spectrum. In the real-world, however, some spectral regrowth (i.e., increase in spectral bandwidth) is inevitable due to imperfect signal amplification.

In wireless communication systems various methodologies have been used to minimize spectral regrowth. Some conventional methodologies utilize complex digital signal processing algorithms to alter a digitally modulated transmission signal in some manner conducive to minimal spectral regrowth. Such complex algorithmic methodologies are well suited to low-throughput applications, i.e., those less than 0.5 Mbps (megabits per second), such as transmission of vocoder or other audio data. This is because the low throughput rate allows sufficient time between symbols for the processor to perform extensive and often repetitive calculations to effect the required signal modification. Unfortunately, high-throughput applications, i.e., those greater than 0.5 Mbps, such as the transmission of high-speed video data, cannot use complex processing algorithms because the processing power required to process the higher data rate is impractical.

A digital signal processing methodology may be used with the transmission of burst signals. With burst transmissions, the interstitial time between bursts may be used to perform the necessary complex computations based upon an entire burst. This methodology is not practical when continuous (as opposed to burst) transmission is used.

A conventional form of post-modulation pulse shaping to minimize spectral bandwidth utilizes some form of Nyquist-type filtration, such as Nyquist, root-Nyquist, raised cosine-rolloff etc. Nyquist-type filters are desirable as they provide a nearly ideal spectrally constrained waveform and negligible inter-symbol interference. This is achieved by spreading the datum for a single constellation phase point over many unit baud intervals in such a manner that the energy from any given phase-point datum does not interfere with the energy from preceding and following phase-point data at the appropriate baud-interval sampling instants.

The use of Nyquist-type filtration in a transmission circuit produces a filtered signal stream containing a pulse waveform with a spectrally constrained waveform. The degree to which a Nyquist-type pulse waveform is constrained in bandwidth is a function of the excess bandwidth factor, $\alpha$. The smaller the value of $\alpha$, the more the pulse waveform is constrained in spectral regrowth. It is therefore desirable to have the value of $\alpha$ as small as possible. However, as the value of $\alpha$ is decreased, the ratio of the spectrally constrained waveform magnitude to the spectrally unconstrained waveform magnitude is increased. The spectrally unconstrained waveform is the waveform that would result if no action were taken to reduce spectral regrowth. Typical designs use [a] $\alpha$ values of 0.15 to 0.5. For an exemplary [a] $\alpha$ value of 0.2, the magnitude of the spectrally constrained waveform is approximately 1.8 times that of the unconstrained waveform. This means that, for a normalized spectrally unconstrained waveform magnitude power of 1.0, the transmitter output amplifier must actually be able to provide an output power of 3.24 ($1.8^2$) to faithfully transmit the spectrally constrained waveform. This poses several problems.

When the transmitter output amplifier is biased so that the maximum spectrally unconstrained waveform (1.0 normalized) is at or near the top of the amplifier's linear region, all "overpower" will be clipped as the amplifier saturates. Such clipping causes a marked increase in spectral regrowth, obviating the use of Nyquist-type filtration.

When the transmitter output amplifier is biased so that the maximum spectrally constrained waveform (1.8 normalized) is at or near the top of the amplifier's linear region, the spectrally unconstrained waveform is at only 56 percent (i.e., $1/1.8$) of the amplifiers peak linear power. This results in an inefficient use of the output amplifier.

Also, the biasing of the transmitter output amplifier so that the spectrally constrained waveform is at or near the top of the amplifier's linear region requires that the output amplifier be of significantly higher power than that required for the transmission of a spectrally unconstrained waveform. Such a higher-power amplifier is inherently more costly than its lower-power counterparts.

SUMMARY OF THE INVENTION

It is an advantage of the present invention that a circuitry and a methodology are provided that allow a transmitter output amplifier to be biased so that the spectrally unconstrained waveform is at or near the top of the amplifier's linear region without incurring clipping of a spectrally constrained waveform.

It is another advantage of the present invention that a circuitry and methodology are provided that allow a spectrally constrained waveform to have approximately the same magnitude as the spectrally unconstrained waveform without effecting a significant increase in spectral regrowth.

It is another advantage of the present invention that a circuitry and methodology are provided which allow a spectrally constrained waveform to be utilized with a continuous transmission scheme.

It is another advantage of the present invention that a circuitry and methodology are provided which allow efficient use of a transmitter output amplifier, thus allowing higher power output for a given output amplifier and a given bandwidth constraint than was previously feasible.

It is another advantage of the present invention that a circuitry and methodology are provided which allow efficient use of a transmitter output amplifier, which allows allowing a lower-power amplifier to be used for achieving given bandwidth constraints than was previously feasible, thus effecting a significant saving in the cost thereof.

These and other advantages are realized in one form by a constrained-envelope digital communications transmitter circuit. The transmitter circuit has a pulse-spreading filter configured to receive a quadrature phase-point signal stream of digitized quadrature phase points and produce a filtered signal stream, which filtered signal stream exhibits energy corresponding to each phase point spread throughout a plurality of baud intervals. The transmitter circuit also has a constrained-envelope generator coupled to the pulse-spreading filter and configured to produce a constrained-bandwidth bandwidth error signal stream. The transmitter circuit also has a combining circuit coupled to the pulse-spreading filter and to the constrained-envelope generator, which combining circuit is configured to combine the filtered signal stream and the constrained-bandwidth error signal stream to produce a constrained-envelope signal stream. The transmitter circuit also has a substantially linear amplifier with an input coupled to the combining circuit.

These and other advantages are realized in another form by a method for the transmission of a constrained-envelope communications signal in a digital communications system. The transmission method includes the step of filtering a quadrature phase-point signal stream to produce a filtered signal stream, which filtering step spreads energy from each phase point over a plurality of baud intervals. The transmission method also includes the step of generating a constrained-band error signal stream from the filtered signal stream and a threshold signal. The transmission method also includes the step of combining the filtered signal stream and the constrained-bandwidth error signal stream to produce a constrained-envelope signal stream. The transmission method also includes the step of linearly amplifying the constrained-envelope signal stream to produce the constrained-envelope communications signal. The transmission method also includes the step of transmitting the constrained-envelope communications signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
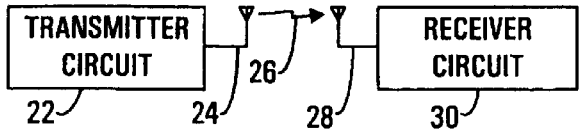
FIG. 1 depicts a simplified block diagram of a digital communications system in accordance with a preferred embodiment of the present invention.
Figure 2:
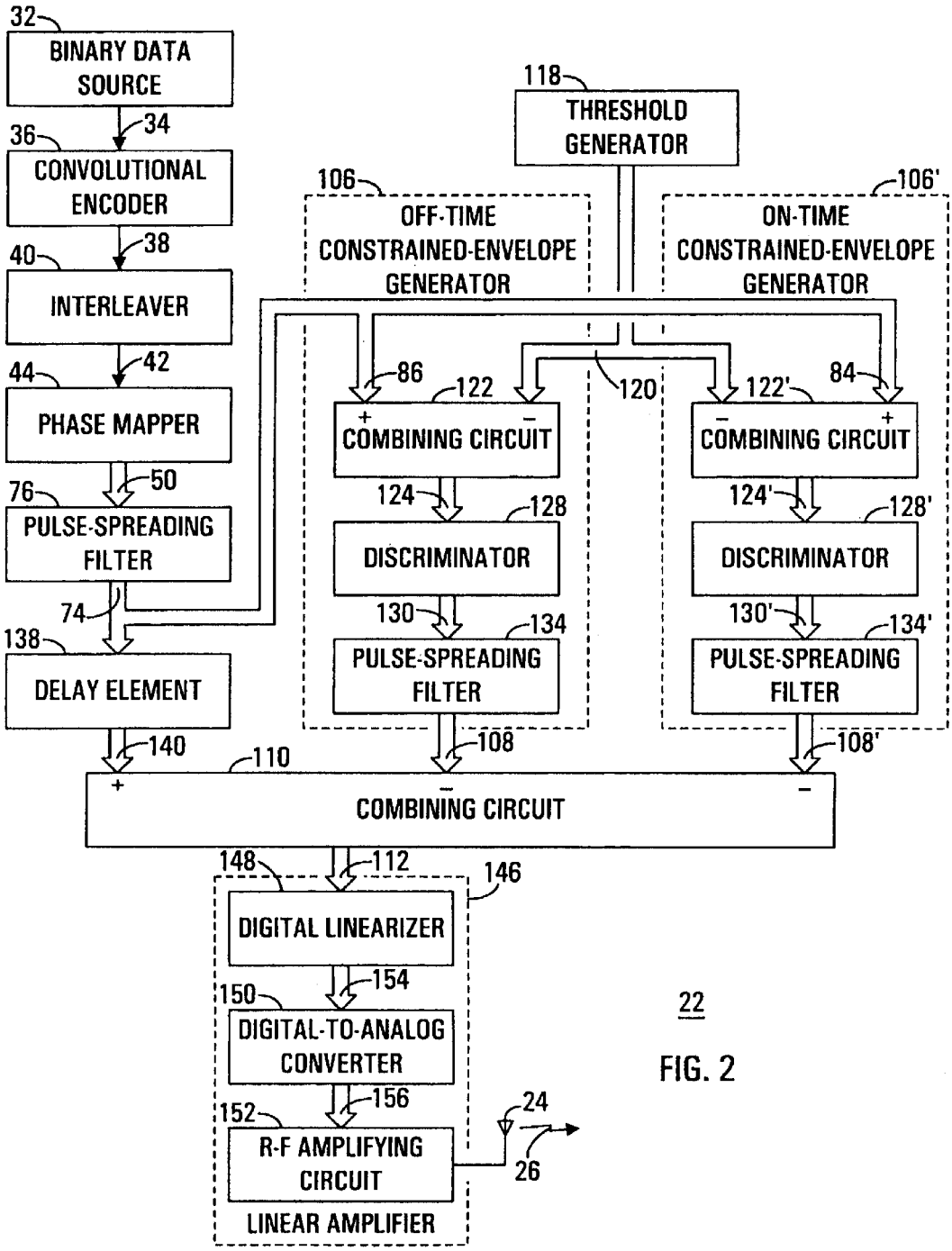
FIG. 2 depicts a block diagram of a constrained-envelope digital communications transmitter circuit in accordance with a preferred embodiment of the present invention.

FIG. 1 depicts a simplified block diagram of a digital communications system 20 and FIG. 2 depicts a block diagram of a constrained-envelope digital communications transmitter circuit 22 in accordance with a preferred embodiment of the present invention. The following discussion refers to FIGS. 1 and 2.

Digital communications system 20, as depicted in FIG. 1, includes a transmitter circuit 22 and a transmitter antenna 24 together configured to modulate and transmit a radio-frequency (RF) broadcast signal 26 to a receiver antenna 28 and a receiver circuit 30, together configured to receive and demodulate RF broadcast signal 26. Those skilled in the art will appreciate that the embodiment of system 20 depicted is a simplistic one for purposes of discussion only. In normal use, system 20 would likely be a complex system consisting of many more components and broadcast signals. It will be appreciated that the use of such a complex communications system for system 20 in no way departs from the spirit of the present invention or the scope of the appended claims.

Transmitter circuit 22 has a binary data source 32 providing a binary input signal stream 34. Binary data source 32 may be any circuitry, device, or combination thereof producing input signal stream 34. Input signal stream 34 is made up of binary data that may be pre-encoded in any desired manner. That is, input signal stream 34 may be made up of data that has no encoding, concatenated encoding, Reed-Solomon block encoding, or any other form of encoding desired for or required of the communications scheme in use.

In the preferred embodiment, input signal stream 34 is a steam of continuous data (as contrasted with burst data) passing to an input of a convolutional encoder 36. Convolutional encoder 36 convolutionally encodes (e.g., Viterbi encodes) input signal stream 34 into an encoded signal stream 38. The use of convolutional encoder 36 in transmitter circuit 22 and a like convolutional decoder (not shown) in receiver circuit 30 significantly reduces the error rate of the overall signal in a manner well understood by those skilled in the art. However, convolutional encoder 36 may be omitted.

Interleaver 40 temporally decorrelates encoded signal stream 38 to produce an interleaved signal stream 42. That is, the symbols making up the binary signal stream are temporally decorrelated (i.e., separated) in transmitter circuit 22 and temporally correlated in receiver circuit 30. This is done so that correlated errors produced by downstream transmitter components, discussed hereinbelow, will then be decorrelated through a complimentary de-interleaver located in receiver circuit 30 before convolutional decoding in receiver circuit 30.

In the preferred embodiment, interleaved signal stream 42 passes to an input of a phase mapper 44. Those skilled in the art will appreciate that interleaver 40 is not desired in all embodiments of transmitter circuit 22, for example when convolutional encoder 36 is omitted. When interleaver 40 is omitted, encoded signal stream 38 is passed directly to the input of phase mapper 44. When both convolutional encoder 36 and interleaver 40 are omitted, binary input signal stream passes directly to the input of phase mapper 44.

Figure 3:
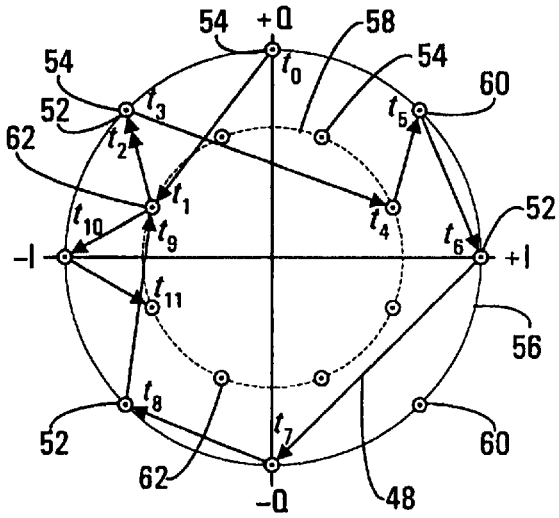
FIG. 3 depicts a 16-P-APSK constellation illustrating a locus of a quadrature phase-point signal stream over twelve exemplary consecutively mapped phase points in accordance with a preferred embodiment of the present invention.

FIG. 3 depicts a sixteen phase-point polar amplitude and phase shift keying (16-P-APSK) constellation 46 illustrating a locus 48 of a quadrature phase-point signal stream 50 (FIG. 2) over twelve exemplary sequential phase points 52 in accordance with a preferred embodiment of the present invention. The following discussion refers to FIGS. 2 through 3.

Phase mapper 44 maps symbols (i.e., binary data units) present in interleaved signal stream 42, encoded signal stream 38, or input signal stream 34, into phase points 54 in phase-point constellation 46. While constellation 46 is depicted in FIG. 3 as a 16-P-APSK constellation, those skilled in the art will appreciate that the circuitry and methodology of the present invention may be applied to all forms of constellations. The present invention is especially beneficial when used with constellations having rings of different magnitudes, i.e., amplitude and phase-shift keying (APSK) constellations. This is true because APSK constellations, requiring amplitude modulation of the signal, desirably use linear amplifiers to reproduce that amplitude modulation.

Each phase point 54 in constellation 46 represents a plurality, in this example four, of symbols. The values of the symbols in a given phase point 54 determine the location of that phase point 54 within constellation 46 in a manner well known to those skilled in the art.

Each quadrature phase point 54 may be thought of as having a vector value expressed as I,Q in the Cartesian coordinate system, where I is the in-phase (abscissa) value and Q is the quadrature (ordinate) value of the vector, or expressed as M,ϕ in the polar coordinate system, where M is the magnitude and ϕ is the phase angle of the vector. In this discussion, the M,ϕ designation will be used throughout, as the vector magnitude is the most discussed vector component.

In the exemplary 16-P-APSK constellation 46 of FIG. 3, each phase point 54 resides upon an outer ring 56 or an inner ring 58. Phase-points 54 residing upon outer ring 56 are outer-ring or maximum-magnitude phase points 60. That is, outer-ring phase points 60 have a maximum magnitude (maximum value of M) as represented by the radius of outer ring 56. For purposes of discussion, the magnitudes of outer-ring phase points 60 are normalized to 1.00.

Inner-ring phase points 62, i.e., those phase points 54 residing upon inner ring 58, have a lesser magnitude as represented by the radius of inner ring 58. For the exemplary 16-P-APSK constellation 46 depicted in FIG. 3, the magnitudes of inner-ring phase points 62 may desirably be approximately 0.63 when outer-ring phase point 60 magnitudes are normalized to 1.00.

Figure 4:
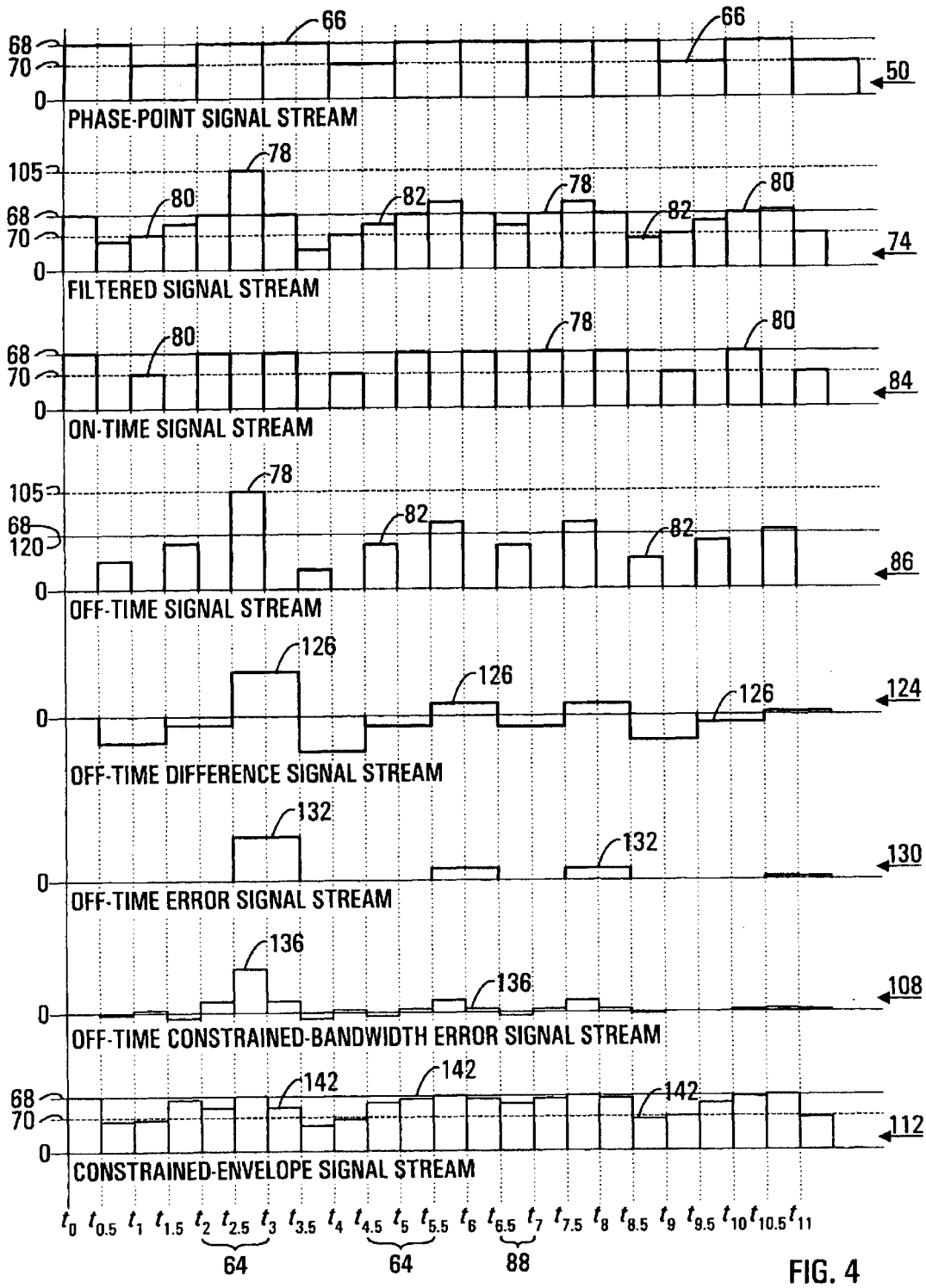
FIG. 4 depicts a plurality of signal streams in accordance with a preferred embodiment of the present invention.

FIG. 4 depicts a plurality of signal streams, in accordance with a preferred embodiment of the present invention. The following discussion refers to FIGS. 2 through 4.

The output of phase mapper 44 is phase-point signal stream 50. Phase mapper 44 processes one phase point 54 per unit baud interval 64. That is, phase-point signal stream 50 consists of a series of consecutive phase-point pulses 66, each of which represents one phase point 54, whose leading edges are one unit baud interval 64 apart. Those skilled in the art will appreciate that other embodiments of phase-point signal stream 50 are equally valid, that the embodiment utilized is dependent upon the circuitry producing and processing phase-point signal stream 50, and that the use of other embodiments of this or any other signal stream does not depart from the spirit of the present invent nor the scope of the appended claims.

FIGS. 3 and 4 illustrate a series of twelve exemplary sequential phase points 52, representative of a random data stream processed by transmitter circuit 22 (FIG. 2). These twelve exemplary phase points 52 reside at temporally consecutive locations labeled $t_0$, $t_1$, $t_2$, $t_3$, $t_4$, $t_5$, $t_6$, $t_7$, $t_8$, $t_9$, $t_{10}$, and $t_{11}$. These labels represent sequential integral times at unit baud intervals 64, i.e., integral-baud times, and indicate the leading-edge times of phase-point pulses 66. For purposes of simplification within this discussion, any occurrence at time $t_N$ shall be referred to as "occurrence $t_N$". For example, an exemplary phase point 52 occurring at time $t_2$ shall be referred to as phase point $t_2$, and the associated phase-point pulse 66 whose leading edge occurs at time $t_2$ shall be referred to as phase-point-signal pulse $t_2$. In other words, at time $t_2$, phase point $t_2$ is clocked and phase-point-signal pulse $t_2$ begins. One unit baud interval 64 later, at time $t_3$, phase point $t_3$ is clocked and phase-point pulse $t_3$ begins. This process continues indefinitely, with twelve exemplary phase points $t_0$ through $t_{11}$ depicted in FIG. 3 and twelve corresponding phase-point-signal pulses $t_0$ through $t_{11}$ depicted in phase-point signal stream 50 of FIG. 4.

Table 1 below illustrates the magnitudes for phase-point-signal pulses to through $t_{11}$.

TABLE 1

Phase-Point Pulse Magnitudes

| Phase-Point-Signal Pulse | Magnitude |
|---|---|
| $t_0$ | Outer-Ring 68 |
| $t_1$ | Inner-Ring 70 |
| $t_2$ | Outer-Ring 68 |
| $t_3$ | Outer-Ring 68 |
| $t_4$ | Inner-Ring 70 |
| $t_5$ | Outer-Ring 68 |
| $t_6$ | Outer-Ring 68 |
| $t_7$ | Outer-Ring 68 |
| $t_8$ | Outer-Ring 68 |
| $t_9$ | Inner-Ring 70 |
| $t_{10}$ | Outer-Ring 68 |
| $t_{11}$ | Inner-Ring 70 |

Phase point $t_0$ is an outer-ring phase point 60. Phase-point-signal pulse to therefore has an outer-ring magnitude 68. In like manner, phase point $t_1$ is an inner-ring phase point 62 and phase-point-signal pulse $t_1$ has an inner-ring magnitude 70.

Phase-point signal stream 50 effects locus 48 through constellation 46. Locus 48 coincides with the location of each exemplary phase point $t_0$ through $t_{11}$ in turn at unit baud intervals 64. In FIG. 3, locus 48 is depicted as effecting a minimum distance (straight line) path between adjacent exemplary phase points 52. Those skilled in the art will appreciate that locus 48 is so depicted solely for the sake of simplicity, and that in actual practice, locus 48 instantly jumps or snaps between exemplary phase points 52 in a discontinuous manner.

Figure 5:
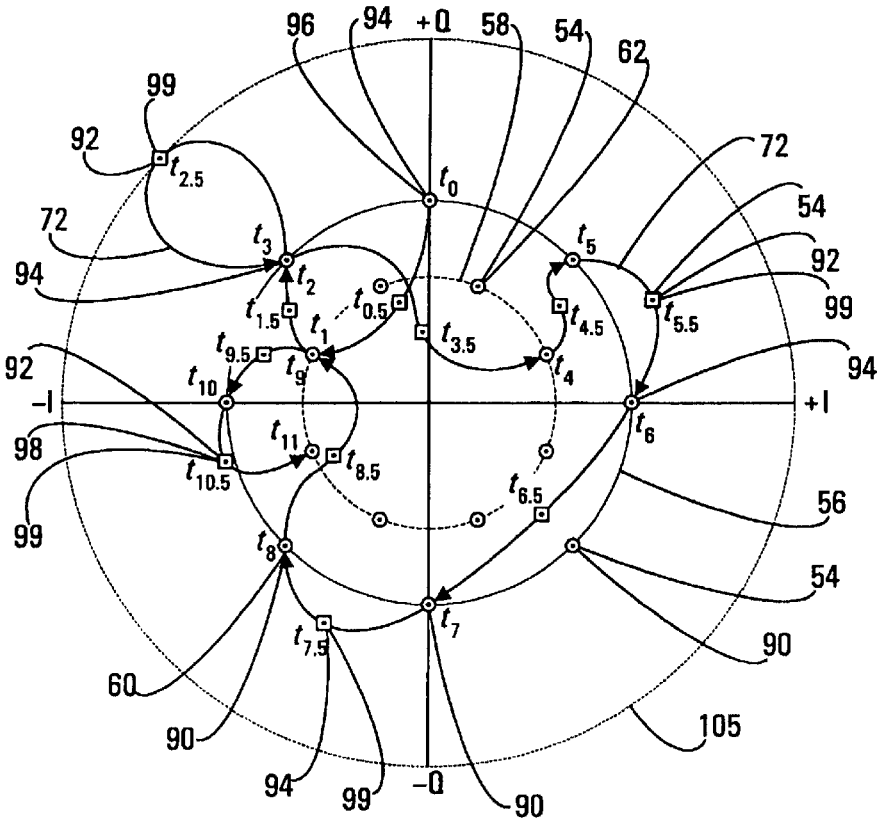
FIG. 5 depicts the phase-point constellation of FIG. 3 illustrating an exemplary locus of a filtered signal stream over the twelve consecutively mapped phase points of FIG. 3 in accordance with a preferred embodiment of the present invention.

FIG. 5 depicts an expanded phase-point constellation 46' illustrating a locus 72 of a filtered signal stream 74 (FIG. 2) over twelve exemplary sequential phase points 52 in accordance with a preferred embodiment of the present invention. The following discussion refers to FIGS. 2 through 5.

In the preferred embodiment, phase-point signal stream 50 passes to the input of a pulse-spreading filter 76, preferably realized as a Nyquist-type filter, such as a Nyquist, root-Nyquist, raised cosine-rolloff, etc., filter. Pulse-spreading filter 76 filters phase-point signal stream 50 into filtered signal stream 74, depicted in FIG. 5. In orthogonal frequency division multiplex (OFDM) systems, also known as multitone modulation (MTM) systems, pulse-spreading filter 76 may be implemented using a transmultiplexer or equivalent circuitry.

In accordance with Shannon's theory, well known to those skilled in the art, pulse-spreading filter 76 produces at least two (only two in the preferred embodiment) output filtered-signal pulses 78, i.e., complex samples of filtered signal stream 74, for each input phase-point pulse 66 received. This is demonstrated in FIG. 4 where filtered signal stream 74 possesses two filtered-signal pulses 78 per unit baud interval 64. In the preferred embodiment, filtered-signal pulses 78 consist of alternating on-time pulses 80, i.e., samples of filtered signal stream at integral unit baud intervals 64, and off-time pulses 82, i.e., samples of filtered signal stream 74 between integral unit baud intervals. In effect, filtered signal stream 74 is made up of two interleaved data streams, an on-time signal stream 84 and an off-time signal stream 86.

On-time signal stream 84 is substantially a version of phase-point signal stream 50, wherein each phase-point pulse 66 has been reduced in duration from one unit baud interval 64 to a half-unit baud interval 88 to become on-time pulse 80 while maintaining substantially the same relative leading-edge time. That is, filtered-signal pulse to has substantially the same magnitude and substantially the same leading edge time as phase-point pulse to with approximately one-half the duration. Of course, those skilled in the art will appreciate that signal streams 74 and 84 may be delayed from signal stream 50 by a delay imposed by filter 76.

The generation of both on-time pulses 80 and off-time pulses 82 by pulse-spreading filter 76 effectively populates expanded constellation 46' (FIG. 5) with on-time phase-points 90 (circles) and off-time phase points 92 (squares). The original phase points 54 of constellation 46 (FIG. 3), i.e., the phase points carrying the intelligence to be communicated by transmitter circuit 22, are on-time phase points 90 of expanded constellation 46'.

Added to expanded constellation 46' are off-time phase points 92, with each off-time phase-point 92 occurring approximately midway in time between consecutive on-time phase points 90. Therefore, exemplary sequential phase points 52 become exemplary filtered phase points 94. Exemplary filtered phase points 94 are made up of alternating exemplary on-time filtered phase points 96 and exemplary off-time filtered phase points 98, and reside at temporally consecutive locations labeled $t_0$, $t_{0.5}$, $t_1$, $t_{1.5}$, $t_2$, $t_{2.5}$, t4, $t_{3.5}$, $t_4$, $t_{4.5}$, $t_5$, $t_{5.5}$, $t_6$, $t_{6.5}$, $t_7$, $t_{7.5}$, $t_8$, $t_{8.5}$, $t_9$, $t_{9.5}$, $t_{10}$, $t_{10.5}$, and $t_{11}$, In FIG. 5, exemplary on-time filtered phase points 96 are located at integral-baud times ($t_0$, $t_1$, $t_2$, etc.), whereas exemplary off-time filtered phase points 98 are located at fractional-baud (non-integral-baud) times ($t_{0.5}$, $t_{1.5}$, $t_{2.5}$, etc.).

The generation of off-time phase points 92 approximately midway in time between consecutive on-time phase points 90 causes filtered signal locus 72 to effect excursions having local peak magnitudes 99 greater than outer-ring magnitude 68. Such excursions occur because the immediate position of locus 72 at any given instant in time is not only a result of those phase points 54 proximate that position, but of a plurality of phase points 54 both preceding and following that instant in time. That is, in the preferred embodiment, the determination of the position of locus 72 at time $t_{2.5}$ (i.e., coincident with off-time phase point $t_{2.5}$) is determined not only by the positions of phase points $t_2$ and $t_3$, but by the positions of numerous phase points 54 preceding phase point $t_{2.5}$ (i.e., phase points $t_2$, $t_{1.5}$, $t_1$, $t_{0.5}$, etc.) and the positions of numerous phase points 54 following phase point $t_{2.5}$ (i.e., phase points $t_3$, $t_{3.5}$, $t_4$, $t_{4.5}$, etc.)

Figure 6:
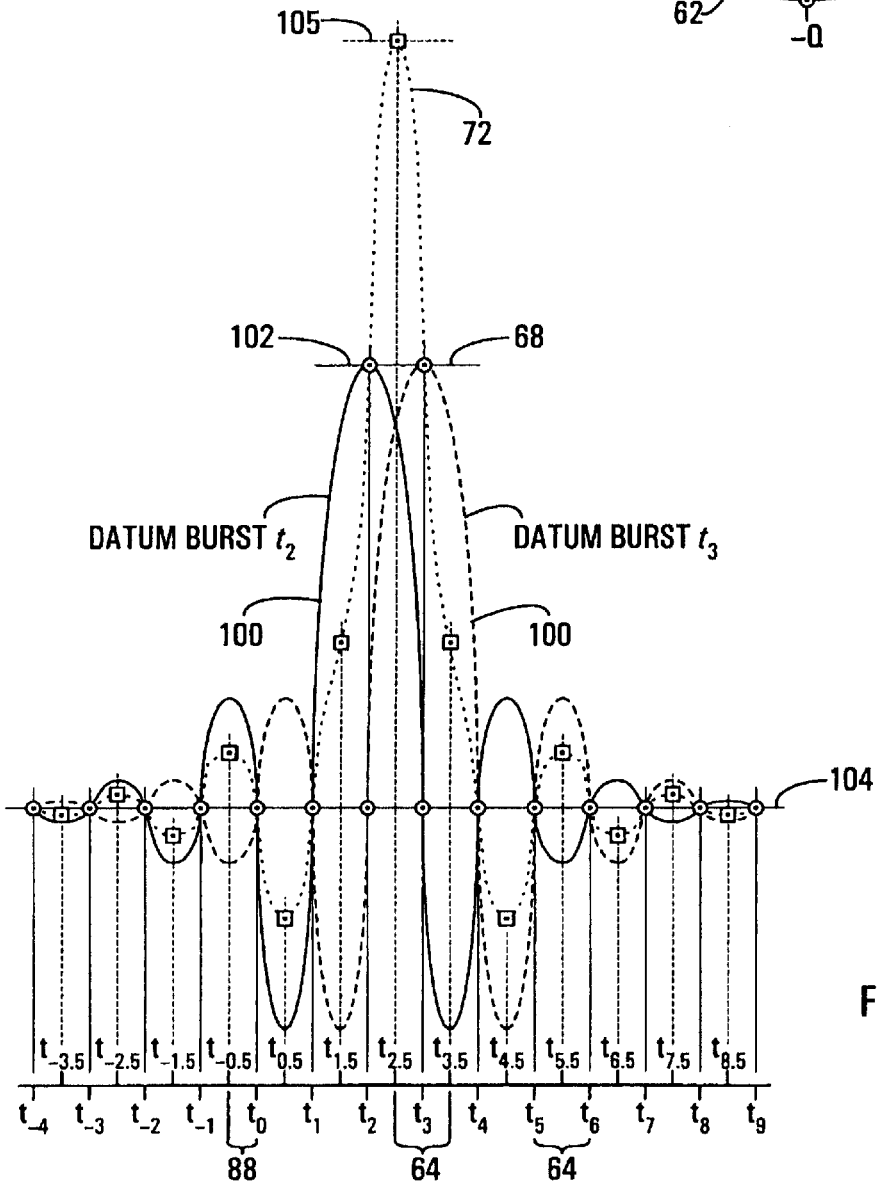
FIG. 6 depicts a pair of Nyquist-type data bursts in accordance with a preferred embodiment of the present invention.

This phenomenon is illustrated in FIG. 6, which depicts a pair of Nyquist-type datum bursts 100 in accordance with a preferred embodiment of the present invention. The following discussion refers to FIGS. 2, 4, 5, and 6.

In the preferred embodiment, pulse-spreading filter 76 is realized as a Nyquist-type filter. Therefore, when a single phase-point pulse 66 is filtered by pulse-spreading filter 76, that single pulse 66 is transformed into a Nyquist-type datum burst 100 extending over a plurality of unit baud intervals 64. It is a property of Nyquist-type filters that datum burst 100 attains a datum-burst peak value 102 (i.e., a local peak magnitude) at the primary sampling time of the specific phase-point pulse 66 (i.e., at time $t_2$ for phase-point pulse $t_2$), and attains a zero datum-burst value 104 (i.e., is equal to zero) at integral unit baud intervals 64 preceding and following peak datum-burst value 102 (i.e., at times . . . , $t_{-1}$, $t_0$, $t_1$, and $t_3$, $t_4$, $t_5$, . . . , for phase point pulse $t_2$). In this manner, the energy of each pulse 78 is spread over a plurality of baud intervals 64 preceding and following the clocking instant (time $t_2$).

FIG. 6 illustrates Nyquist-type datum bursts 100 for phase-point pulses $t_2$ and $t_3$, with datum burst $t_2$ depicted as a solid line and datum burst $t_3$ depicted as a dashed line. As an example, it may be seen from FIG. 6 that at time $t_2$ the value of datum burst $t_2$ is peak datum-burst value 102. At every other time separated from time $t_2$ by an integral number of unit baud intervals 64, the value of datum burst $t_2$ is zero. An analogous condition occurs for datum burst $t_3$.

The value of locus 72 is, at each moment in time, the sum of all datum bursts 100 at that moment. In the simplified two-datum-burst example of FIG. 6, locus 72, depicted by a dotted line, is the sum of datum burst $t_2$ and datum burst $t_3$. Since datum bursts $t_2$ and $t_3$ are zero at each integral time $t_N$ except times $t_2$ and $t_3$, the value of locus 72 is also zero except at times $t_2$ and $t_3$, where it assumes the peak values of datum bursts $t_2$ and $t_3$, respectively.

The value of locus 72 at any instant in time between integral-baud times is the sum of the values of all datum bursts 100 at that instant. For example, in FIG. 6 where only two datum bursts 100 are considered, locus 72 has a value at time $t_{2.5}$ that is the sum of the values of datum bursts $t_2$ and $t_3$ at time $t_{2.5}$. Since datum bursts $t_2$ and $t_3$ both have significant positive values at time $t_{2.5}$, locus 72 has a value significantly greater than the maximum values of either datum burst $t_2$ or datum burst $t_3$.

Since locus 72 describes the sum of all datum bursts 100, locus 72 is a function of the shape of the curves (FIG. 6) describing those datum bursts 100. That is, locus 72 is a function of a filtered-signal peak magnitude component of a filtered-signal complex digital value at any given point. The shape of the datum-burst curve is a function of the excess bandwidth factor, $\alpha$, a design property of pulse-spreading filter 76. The smaller the value of $\alpha$, the more locus 72 may rise above the peak datum burst values 102 of adjacent datum bursts 100. Typical designs of pulse-spreading filters 76 use $\alpha$ values of 0.15 to 0.5. For like-valued adjacent phase points 54 and an $\alpha$ value of 0.2, a maximum excursion magnitude 105 (i.e., the potential local peak magnitude 99 of locus 72) is approximately 1.8 times the value of the maximum phase-point magnitude. That is, the magnitude of the constrained envelope is approximately 1.8 times that of the unconstrained envelope. In the preferred embodiment depicted in FIGS. 3, 4, and 6, on-time phase points $t_2$ and $t_3$ are both outer-ring phase points 60 having a normalized outer-ring magnitude 68 of 1.00. Therefore, off-time phase point $t_{2.5}$ may have a normalized maximum excursion magnitude 105 of 1.8. This implies that transmitter circuit 22, to faithfully transmit phase point $t_{2.5}$ without excessive distortion, and without the benefit of the present invention, would require an output power of 3.24 ($1.8^2$) times the power required to transmit phase point $t_2$ or $t_3$, which are representative to the highest magnitude intelligence-carrying phase points 54. This represents an inefficient use of available power.

The following discussion refers to FIGS. 2, 4, and 5.

Off-time signal stream 86, a portion of filtered signal stream 74, passes from an output of pulse-spreading filter 76 to an input of an off-time constrained-envelope generator 106. It is the task of off-time constrained-envelope generator 106 to produce an off-time constrained-bandwidth error signal stream 108 from off-time signal stream 86. A complex summing or combining circuit 110 combines off-time constrained-bandwidth error signal stream 108 with a delayed version of filtered signal stream 74 (discussed below) to produce a constrained-envelope signal stream 112. Constrained-envelope signal stream 112 is effectively filtered signal stream 74 with compensation for excursions of locus 72 with magnitudes greater than outer-ring magnitude 68.

A quadrature threshold generator 118 generates a quadrature threshold signal 120. In the preferred embodiment, threshold signal 120 is a steady-state, constant signal having a value approximately equal to outer-ring magnitude 68. Threshold signal 120 is used to establish a reference with which off-time signal stream 86 is compared. Those skilled in the art will appreciate that threshold signal 120 may assume many forms and values in keeping with the methodology and circuitry incorporated in the comparison. The use of other forms and/or other values does not depart from the spirit of the present invention nor from the scope of the appended claims.

Threshold signal 120 and off-time signal stream 86 are combined in an off-time complex summing or combining circuit 122 to produce an off-time difference signal stream 124. Off-time difference signal stream 124 is made up of a series of off-time difference pulses 126 whose values are the difference between the values of equivalent off-time pulses 82 and the value of threshold signal 120. Since any given off-time pulse 82 may have a value greater than, equal to, or less than the value of threshold signal 120, off-time difference signal stream 124 would normally be made up of a combination of off-time difference pulses 126 having positive, zero, and negative values.

Off-time difference signal stream 124 is passed to the input of an off-time discriminator 128 to produce an off-time error signal stream 130. In the preferred embodiment, off-time error signal stream 130 is a variation of off-time difference signal stream 124 in which all off-time difference pulses 126 having positive values are passed unchanged as off-time error pulses 132 while all other off-time difference pulses 126 are passed as zero-value pulses (i.e., eliminated). In other words, off-time error signal stream 130 is formed from pulses, the timing of which coincide with excursions of locus 72 beyond the outer-ring magnitude 68 and the magnitudes of which correspond to the degree to which locus 72 passes beyond outer-ring magnitude 68.

Off-time error signal stream 130 is then passed to the input of an off-time pulse-spreading filter 134. Off-time pulse-spreading filter 134 is substantially identical to first pulse-spreading filter 76. That is, in the preferred embodiment, both pulse spreading filters 76 and 134 are realized as Nyquist-type filters with substantially identical transfer characteristics. Off-time pulse-spreading filter 134 produces off-time constrained-bandwidth error signal stream 108 and completes the action of off-time constrained-envelope generator 106.

Within off-time constrained-envelope generator 106, off-time pulse-spreading filter 134 receives one off-time error pulse 132 from off-time discriminator 128 per unit baud interval 64. Off-time pulse-spreading filter 134 then transforms each off-time error pulse 132 into a Nyquist-type error burst (not shown) extending over a plurality of unit baud intervals. Since off-time pulse-spreading filter 134 is a Nyquist-type filter, each error burst attains an error-burst peak value (not shown) at the primary sampling time of the specific off-time error pulse 132 (i.e., at time $t_{2.5}$ for error pulse $t_{2.5}$), and attains a zero error-burst value (not shown) at integral unit baud intervals 64 preceding and following the peak error-burst value (i.e., at times . . . , $t_{-1.5}$, $t_{0.5}$, $t_{1.5}$, and $t_{3.5}$, $t_{4.5}$, $t_{5.5}$, . . . , for error pulse $t_{2.5}$). In this manner, the energy of each off-time constrained-envelope error pulse 136 is spread over a plurality of baud intervals 64 preceding and following the clocking instant (time $t_{2.5}$). This results in the conversion of off-time error signal stream 130 into off-time constrained-bandwidth error signal stream 108. Off-time constrained-bandwidth error signal stream 108 is made up of off-time constrained-envelope error pulses 136. This operation is essentially the same as the operation of pulse-spreading filter 76 in the conversion of phase-point signal stream 50 into filtered signal stream 74 described hereinabove.

Since off-time constrained-envelope error pulses 136 are derived from off-time pulses 82, the error-burst peak and zero values occur approximately midway between integral baud times, i.e., at baud times $t_{0.5}$, $t_{1.5}$, $t_{2.5}$, etc., hence between datum-burst peak and zero values 102 and 104 of filtered signal stream 74.

The production of off-time constrained-bandwidth error signal stream 108 completes the operation of off-time constrained envelope generator 106.

Filtered signal stream 74 is also passed to the input of a delay element 138. Delay element 138 produces delayed signal stream 140, which is effectively filtered signal stream 74 delayed sufficiently to compensate for the propagation and other delays encountered in off-time constrained-envelope generator 106, and particularly in off-time pulse-spreading filter 134. In other words, delayed signal stream 140 is filtered signal stream 74 brought into synchronization with off-time constrained-bandwidth error signal stream 108.

Combining circuit 110 combines filtered signal stream 74, in the form of delayed signal stream 140, and off-time constrained-bandwidth error signal stream 108 to reduce peak magnitude components of filtered signal stream 74. A resultant constrained-envelope signal stream 112 is made up of a series of digital pulses 142 whose values are the difference between the values of corresponding filtered-signal pulses 78 and off-time constrained-envelope error pulses 136. The result is a series of digital pulses 142 whose values do not appreciably exceed outer-ring magnitude 68 of expanded constellation 46'.

In some embodiments of the present invention, certain of outer-ring phase points 60 may have magnitudes greater than outer-ring magnitude 68, i.e., may be located beyond outer ring 56. This condition may occur as a result of pulse-spreading filter 76 executing certain Nyquist-type functions well known to those skilled in the art. In such an embodiment, transmitter circuit 22 contains an on-time constrained envelope generator 106' in addition to off-time constrained-envelope generator 106 discussed above.

On-time signal stream 84, also a portion of filtered signal stream 74, passes from an output of pulse-spreading filter 76 to an input of on-time constrained-envelope generator 106'. It is the task of on-time constrained-envelope generator 106' to produce an on-time constrained-bandwidth error signal stream 108' from on-time signal stream 84. Combining circuit 110 combines both off-time and on-time constrained-bandwidth error signal streams 108 and 108' with the delayed version of filtered signal stream 74 (discussed below) to produce constrained-envelope signal stream 112.

On-time constrained-envelope generator 106' operates in a manner analogous with the operation of off-time constrained-envelope generator 106. Threshold signal 120 and on-time signal stream 84 are combined in an on-time complex summing or combining circuit 122' to produce an on-time difference signal stream 124'. On-time difference signal stream 124' is passed to the input of an on-time discriminator 128' to produce an on-time error signal stream 130'. On-time error signal stream 130' is then passed to the input of an on-time pulse-spreading filter 134', which produces on-time constrained bandwidth error signal stream 108'. Like off-time pulse-spreading filter 134, on-time pulse-spreading filter 134', is substantially identical to first pulse-spreading filter 76.

Since on-time constrained-envelope error pulses (not shown) are derived from on-time pulses 80, the error-burst peak and zero values occur at integral baud times, i.e., at baud times $t_1$, $t_2$, $t_3$, etc., hence between datum-burst peak and zero values 102 and 104 of filtered signal stream 74.

Combining circuit 110 combines filtered signal stream 74, in the form of delayed signal stream 140, with both off-time and on-time constrained-bandwidth error signal stream 108 and 108' to reduce peak magnitude components of filtered signal stream 74.

Figure 7:
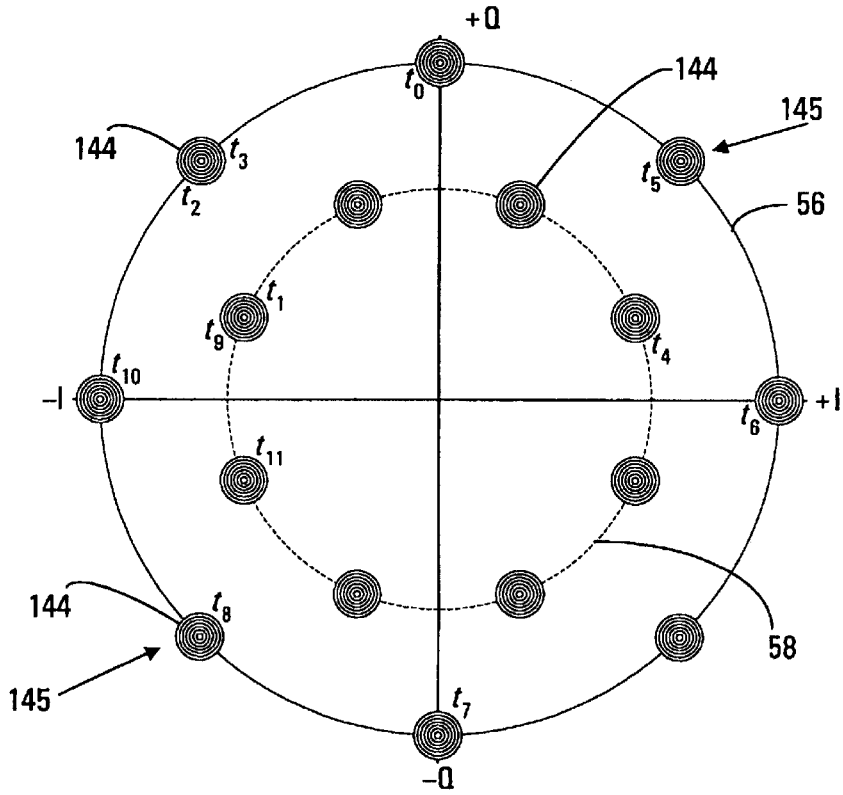
FIG. 7 depicts a noise-influenced constellation illustrating constrained-envelope phase-point probabilities of the phase points of the constellation of FIG. 3 in accordance with a preferred embodiment of the present invention.

A side effect of this methodology is that locus 72 at integral unit baud intervals 64 adds a signal-dependent, baud-limited noise factor to the positions of phase points 54 in constellation 46 (FIG. 3). This results in transmitter circuit 22 transmitting a "noise-influenced" phase-point constellation 46". In FIG. 7, noise-influenced constellation 46" is depicted illustrating constrained-envelope phase-point probabilities 144 of phase points 54 in accordance with a preferred embodiment of the present invention. The following discussion refers to FIGS. 2, 3, 5 and 7.

Phase-point probabilities 144 reside in noise-influenced constellation 46" exactly as phase points 54 reside in constellation 46, i.e., in the same configuration with centers at the same locations. The actual location of a given transmitted phase point 145 within a given phase-point probability 144 is a function of a plurality of variable conditions and, although somewhat correlated, except in certain specialized cases, cannot readily be predicted. In effect, for a given phase point 54, the resultant transmitted phase point 145 may be located anywhere within phase-point probability 144, i.e., within an indeterminate area having a center coincident with the location of the original phase point 54. The probability of transmitted phase point 145 being located at any specific position within that indeterminate area varies as an inverse function of the distance of that specific position from the location of the original phase point 54.

For any given phase point 54, the transmitted phase point 145 may be said to be proximate its idealized position within noise-influenced constellation 46". That is, a locus (not shown) of constrained-envelope signal stream 112 passes proximate the idealized positions of exemplary phase points $t_0$, $t_1$, $t_2$, etc., at the clocking instants in time.

The original phase points 54 of constellation 46, as produced by phase mapper 44, are on-time phase points 90 (circles) of expanded constellation 46'. It is these on-time phase points 90 that carry the intelligence of RF broadcast signal 26 as ultimately transmitted. Off-time phase points 92 (squares) are by-products of pulse-spreading filter 76, required to constrain spectral regrowth, and carry no intelligence. Phase-point probabilities 144 of noise-influenced constellation 46" represent the resultant areas of probable locations of transmitted phase points 145 as derived from on-time phase points 90. The centers of phase-point probabilities 144 occupy the same normalized locations within noise-influenced constellation 46" as do on-time phase points 90 within expanded constellation 46'.

The positional aberrations of transmitted phase points 145 relative to the corresponding on-time phase points 90 represent a degree of positional error. This positional error degrades the bit error rate and effects a detriment to transmission. The absence of off-time phase points 92 with a magnitude significantly greater than outer-ring magnitude 68 (FIG. 4) in constrained-envelope signal stream 112, however, allows an increase in power output for a given bandwidth and power amplifier that more than compensates for the position error of transmitted phase points 145. A net improvement in performance results.

Referring back to FIG. 2, the output of combining circuit 110, constrained-envelope signal stream 112, is passed to an input of a substantially linear amplifier 146. Substantially linear amplifier 146 produces RF broadcast signal 26, which is then broadcast via transmitter antenna 24. In the preferred embodiment, substantially linear amplifier 146 is made up of a digital linearizer 148, a digital-to-analog converter 150, and a radio-frequency (RF) amplifying circuit 152. Those skilled in the art will appreciate that substantially linear amplifier 146 may be realized in any of a plurality of different embodiments other than that described here, and that utilization of any of these different embodiment does not depart from the intent of the present invention nor the scope of the appended claims.

Within substantially linear amplifier 146, digital linearizer 148 alters constrained-envelope signal stream 144 into a pre-distorted digital signal stream 154. Pre-distorted digital signal stream 154 is made non-linear in just the right manner to compensate for non-linearities within digital-to-analog converter 150 and RF amplifying circuit 152, hence linearizing substantially linear amplifier 146.

Digital-to-analog converter 150 then converts pre-distorted digital signal stream 154 into an analog baseband signal 156. Analog baseband signal 156 is then amplified by RF amplifying circuit 152 into RF broadcast signal 26 and transmitted via transmitter antenna 24.

In summary, the present invention teaches a methodology and circuitry by which a transmitter circuit utilizing Nyquist-type filtration may produce a constrained envelope having a magnitude at or near the approximate unconstrained envelope magnitude of the desired constellation. This enables the transmitter output amplifier to be biased so that the maximum unconstrained envelope magnitude is at or near the top of the amplifier's linear region without incurring clipping of the constrained envelope transmissions. This in turn produces a more efficient output amplifier and effects an increase in the power output of a given output amplifier. Conversely, a lower power amplifier may be used to provide the same output power that was previously output. This effects a significant savings in output amplifier cost.

Although the preferred embodiments of the invention have been illustrated and described in detail, it will be readily apparent to those skilled in the art that various modifications may be made therein without departing from the spirit of the invention or from the scope of the appended claims.

What is claimed is:

[1. A constrained-envelope digital communication transmitter circuit comprising:

a pulse-spreading filter configured to receive a quadrature phase-point signal stream of digitized quadrature phase points and produce a filtered signal stream, said filtered signal stream exhibiting energy corresponding to each phase point spread throughout a plurality of unit baud intervals;

a constrained-envelope generator coupled to said pulse-spreading filter and configured to produce a constrained-bandwidth error signal stream;

a combining circuit coupled to said pulse-spreading filter and to said constrained-envelope generator, said combining circuit configured to combine said filtered signal stream and said constrained-bandwidth error signal stream to produce a constrained-envelope signal stream; and a substantially linear amplifier having an input coupled to said combining circuit.]

2. A digital communications transmitter circuit as claimed in claim [1] *6* wherein said pulse-spreading filter is a Nyquist-type filter.

3. A digital communications transmitter circuit as claimed in claim [1] *6* wherein said combining circuit is configured to combine said filtered signal stream and said constrained-bandwidth error signal stream to reduce a peak magnitude component of said filtered signal stream.

4. A digital communications transmitter circuit as claimed in claim 3 wherein said combining circuit is a complex summing circuit.

[5. A digital communications transmitter circuit as claimed in claim 1 wherein:

said pulse-spreading filter is a first pulse-spreading filter;

said transmitter circuit additionally comprises a delay element coupled between said first pulse-spreading filter and said combining circuit; and said constrained-envelope generator comprises a second pulse-spreading filter coupled to said combining circuit.]

6. [A digital communications transmitter circuit as claimed in claim 5] *A constrained-envelope digital communications transmitter circuit comprising:*

*a pulse-spreading filter configured to receive a quadrature phase-point signal stream of digitized quadrature phase points and produce a filtered signal stream, said filtered signal stream exhibiting energy corresponding to each phase point spread throughout a plurality of unit baud intervals;*

*a constrained-envelope generator coupled to said pulse-spreading filter and configured to produce a constrained-bandwidth error signal stream;*

*a combining circuit coupled to said pulse-spreading filter and to said constrained envelope generator, said combining circuit configured to combine said filtered signal stream and said constrained-bandwidth error signal stream to produce a constrained envelope signal stream; and*

*a substantially linear amplifier having an output and having an input coupled to said combining circuit;*

*wherein:*

*said pulse-spreading filter is a first pulse-spreading filter;*

*said transmitter circuit additionally comprises a delay element coupled between said first pulse-spreading filter and said combining circuit; and*

*said constrained-envelope generator comprises a second pulse-spreading filter coupled to said combining circuit;* wherein:

said first pulse-spreading filter is configured so that each phase point is transformed into a Nyquist-type datum burst extending over a plurality of unit baud intervals, having a datum-burst peak value occurring in one of said plurality of unit baud intervals and datum-burst zero values occurring substantially at integral unit baud intervals away from said datum-burst peak value, so that said filtered signal stream in each unit baud interval substantially equals the sum of said Nyquist-type datum bursts from a plurality of phase points; and said constrained-envelope generator is configured so that said second pulse-spreading filter receives error pulses, transforms each error pulse into a Nyquist-type error burst extending over a plurality of unit baud intervals, having an error-burst peak value occurring in one of said plurality of unit baud intervals and error-burst zero values occurring substantially at integral unit baud intervals away from said error-burst peak value, so that said constrained-bandwidth error signal stream in each unit baud interval substantially equals the sum of said Nyquist-type error bursts from a plurality of error pulses.

7. A digital communications transmitter circuit as claimed in claim 6 wherein said constrained-envelope generator is configured so that said Nyquist-type error bursts exhibit said error-burst peak values and said error-burst zero values at instances in time when said Nyquist-type datum bursts exhibit neither said datum-burst peak values nor said datum-burst zero values.

8. A digital communications transmitter circuit as claimed in claim 7 wherein said constrained-envelope generator is configured so that said error-burst peak values and said error-burst zero values occur approximately midway between said datum-burst peak values and said datum-burst zero values.

[9. A digital communications transmitter circuit as claimed in claim 5 wherein said first and second pulse-spreading filters exhibit substantially equivalent transfer characteristics.]

10. [A digital communications transmitter circuit as claimed in claim 5] *A constrained-envelope digital communications transmitter circuit comprising:*

*a pulse-spreading filter configured to receive a quadrature phase-point signal stream of digitized quadrature phase points and produce a filtered signal stream, said filtered signal stream exhibiting energy corresponding to each phase point spread throughout a plurality of unit baud intervals;*

*a constrained-envelope generator coupled to said pulse-spreading filter and configured to produce a constrained-bandwidth error signal stream;*

*a combining circuit coupled to said pulse-spreading filter and to said constrained envelope generator, said combining circuit configured to combine said filtered signal stream and said constrained-bandwidth error signal stream to produce a constrained-envelope signal stream; and*

*a substantially linear amplifier having an input coupled to said combining circuit and having an output;*

*wherein:*

*said pulse-spreading filter is a first pulse-spreading filter;*

*said transmitter circuit additionally comprises a delay element coupled between said first pulse-spreading filter and said combining circuit; and*

*said constrained-envelope generator comprises a second pulse-spreading filter coupled to said combining circuit;* wherein:

said first pulse-spreading filter receives one quadrature phase point per unit baud interval and produces two complex samples of said filtered signal stream per unit baud interval;

said constrained-envelope generator evaluates one of said two complex samples of said filtered signal stream produced by said first pulse-spreading filter per unit baud interval; and said second pulse-spreading filter receives one error pulse per unit baud interval and produces two complex samples of said constrained-envelope error-signal stream per unit baud interval.

[11. A digital communications transmitter circuit as claimed in claim 1 wherein:

said filtered signal stream is a stream of complex digital values, with each of said complex digital values exhibiting a peak magnitude component; and said constrained-envelope generator is configured to determine when ones of said peak magnitude components exceed a threshold value.]

[12. A digital communications transmitter circuit as claimed in claim 11 wherein:

said transmitter circuit additionally comprises a phase mapped coupled to said pulse-spreading filter and configured to select said digitized quadrature phase points from a phase-point constellation, said phase-point constellation having a maximum-magnitude phase point; and said threshold value is a magnitude value approximately equal to a magnitude of said maximum-magnitude phase point.]

[13. A digital communications transmitter circuit as claimed in claim 1 additionally comprising an interleaver coupled to said phase mapper.]

14. [A digital communications transmitter circuit as claimed in claim 1] *A constrained-envelope digital communications transmitter circuit comprising:*

*a pulse-spreading filter configured to receive a quadrature phase-point signal stream of digitized quadrature phase points and produce a filtered signal stream, said filtered signal stream exhibiting energy corresponding to each phase point spread throughout a plurality of unit baud intervals;*

*a constrained-envelope generator coupled to said pulse-spreading filter and configured to produce a constrained-bandwidth error signal stream;*

*a combining circuit coupled to said pulse-spreading filter and to said constrained envelope generator, said combining circuit configured to combine said filtered signal stream and said constrained-bandwidth error signal stream to produce a constrained envelope signal stream; and*

*a substantially linear amplifier having an output and having an input coupled to said combining circuit;* wherein:

said constrained-envelope generator is an off-time constrained-envelope generator;

said constrained-bandwidth error signal stream is an off-time constrained-bandwidth error signal stream;

said transmitter circuit additionally comprises an on-time constrained-envelope generator coupled to said pulse-spreading filter and configured to produce an on-time constrained-bandwidth error signal stream; and said combining circuit is coupled to said pulse-spreading filter, to said off-time constrained-envelope generator, and to said on-time constrained-envelope generator, and said combining circuit is configured to combine said filtered signal stream, said off-time constrained-bandwidth error signal stream, and said on-time constrained-bandwidth error signal stream to produce said constrained-envelope signal stream.

[15. A digital communications transmitter circuit as claimed in claim 1 wherein said substantially linear amplifier comprises;

a digital linearizer configured to pre-distort said constrained-envelope signal stream into a pre-distorted digital signal stream;

a digital-to-analog converter coupled to said digital linearizer and configured to produce an analog baseband signal from said pre-distorted digital signal stream; and a radio-frequency amplifying circuit configured to generate a radio-frequency broadcast signal from said analog baseband signal.]

[16. In a digital communications system, a method for the transmission of a constrained-envelope communications signal, said transmission method comprising the steps of:

filtering a quadrature phase-point signal stream to produce a filtered signal stream, said filtering step spreading energy from each phase point in said filtered signal stream over a plurality of unit baud intervals;

generating a constrained-bandwidth error signal stream from said filtered signal stream and a threshold signal;

combining said filtered signal stream and said constrained-bandwidth error signal stream to produce a constrained-envelope signal stream;

linearly amplifying said constrained-envelope signal stream to produce said constrained-envelope communications signal; and transmitting said constrained-envelope communications signal.]

[17. A transmission method as claimed in claim 16 wherein said combining step comprises the step of reducing a peak magnitude component of said filtered signal stream.]

[18. A transmission method as claimed in claim 16 wherein:

said generating step comprises the step of filtering an error signal stream having one error pulse per unit baud interval to produce said constrained-bandwidth error signal stream, said filtering step spreading energy from each error pulse in said error signal stream over a plurality of unit baud intervals;

said transmission method additionally comprises the step of delaying said filtered signal stream to produce a delayed signal stream; and said combining step combines said delayed signal stream and said constrained-bandwidth error signal stream to produce said constrained-envelope signal stream.]

19. [A transmission method as claimed in claim 16] *In a digital communications system, a method for the transmission of a constrained-envelope communications signal, said transmission method comprising the steps of:*

*filtering a quadrature phase-point signal stream to produce a filtered signal stream, said filtering step spread-*

*ing energy from each phase point in said filtered signal stream over a plurality of unit baud intervals;*

*generating a constrained-bandwidth error signal stream from said filtered signal stream and a threshold signal;*

*combining said filtered signal stream and said constrained-bandwidth error signal stream to produce a constrained-envelope signal stream;*

*linearly amplifying said constrained-envelope signal stream to produce said constrained-envelope communications signal; and*

*transmitting said constrained-envelope communications signal;* wherein:

said filtering step comprises the step of receiving one quadrature phase point per unit baud interval;

said filtering step additionally comprises the step of producing two complex samples of said filtered signal stream per unit baud interval;

said generating step comprises the step of evaluating one of said two complex samples of said filtered signal stream per unit baud interval to produce an error signal stream having one error pulse per unit baud interval; and said generating step additionally comprises the step of filtering said error signal stream to produce said constrained-bandwidth error signal stream having two complex samples of said constrained-bandwidth error signal stream per unit baud interval.

20. A transmission method as claimed in claim 19 wherein said generating step additionally comprises the steps of:

providing said threshold signal; and determining when ones of peak magnitude components of a stream of complex digital values of said filtered signal stream exceed a threshold value of said threshold signal.

[21. A transmission method as claimed in claim 16 wherein:

said filtered signal stream includes two or more complex digital values per unit baud interval, said complex digital values in said filtered signal stream exhibiting local peak magnitudes; and said generating step is configured so that said constrained-bandwidth error signal stream includes two or more complex values per unit baud interval; said complex values in said constrained-bandwidth error signal stream being responsive to said local peak magnitudes of said filtered signal stream so as to spread energy from selected ones of said local peak magnitudes over a plurality of unit baud intervals of said constrained-bandwidth error signal stream.]

[22. A transmission method as claimed in claim 16 wherein said transmitting step continuously transmits said constrained-envelope communications signal.]

[23. A constrained-envelope digital-communications transmitter circuit comprising:

a binary data source configured to provide a binary input signal stream;

a phase mapper coupled to said binary data source and configured to produce a quadrature phase-point signal stream, wherein said phase-point signal stream has a predetermined number of symbols per unit baud interval, said predetermined number of symbols defining a phase point in a phase-point constellation;

a Nyquist-type filter coupled to said phase mapper and configured to produce a filtered signal stream;

a constrained-envelope generator coupled to said Nyquist-type filter and configured to produce a constrained-bandwidth error signal stream;

a delay element coupled to said Nyquist-type filter and configured to produce a delayed signal stream synchronized with said constrained-bandwidth error signal stream;

a complex summing circuit coupled to said delay element and said constrained-envelope generator and configured to produce a constrained-envelope signal stream; and a substantially linear amplifier coupled to said complex summing circuit and configured to produce a radio-frequency broadcast signal.]

24. [A digital-communications transmitter circuit as claimed in claim 23] *A constrained-envelope digital-communications transmitter circuit comprising:*

*a binary data source configured to provide a binary input signal stream;*

*a phase mapper coupled to said binary data source and configured to produce a quadrature phase-point signal stream, wherein said phase-point signal stream has a predetermined number of symbols per unit baud interval, said predetermined number of symbols defining a phase point in a phase-point constellation;*

*a Nyquist-type filter coupled to said phase mapper and configured to produce a filtered signal stream;*

*a constrained-envelope generator coupled to said Nyquist-type filter and configured to produce a constrained-bandwidth error signal stream;*

*a delay element coupled to said Nyquist-type filter and configured to produce a delayed signal stream synchronized with said constrained-bandwidth error signal stream;*

*a complex summing circuit coupled to said delay element and said constrained envelope generator and configured to produce a constrained-envelope signal stream; and*

*a substantially linear amplifier coupled to said complex summing circuit and configured to produce a radio-frequency broadcast signal;* wherein said Nyquist-type filter is a first Nyquist-type filter, said filtered signal stream includes a first filtered-signal data stream and a second filtered-signal data stream, and said complex summing circuit is a first complex summing circuit, wherein said transmitter circuit additionally comprises a quadrature threshold generator configured [to-provide] *to provide* a threshold signal, said threshold signal having a threshold value, and wherein said constrained-envelope generator comprises:

a *second* complex summing circuit coupled to said first Nyquist-type filter and said quadrature threshold generator and configured to produce a difference signal stream, wherein said difference signal stream is a stream of difference pulses having difference-pulse values of a first polarity and difference-pulse values of a second polarity;

a discriminator coupled to said *second* complex summing circuit and configured to produce an error signal stream from said difference signal stream, wherein said error signal stream is a stream of error pulses substantially coincident with said difference pulses of said difference signal stream, and wherein, when ones of said difference pulses have said first-polarity difference-pulse values, said coincident error pulses have error-pulse values substantially equal to said first-polarity difference-pulse values, and when ones of said difference pulses have said second-polarity difference-pulse values, said coincident error pulses have error-pulse values substantially equal to zero; and a second Nyquist-type filter coupled to said discriminator and configured to produce said constrained-bandwidth error signal stream.

25. A digital-communications transmitter circuit as claimed in claim 24 wherein said transmitter circuit additionally comprises:

a convolutional encoder coupled to said binary data source and configured to produce an encoded signal stream; and an interleaver coupled to said convolutional encoder and configured to produce an interleaved signal stream by temporally decorrelating said encoded signal stream.

26. A digital-communications transmitter circuit as claimed in claim 24 wherein:

said filtered signal stream is a quadrature signal stream having a locus that passes proximate one of said phase points of said phase-point constellation at integral unit baud intervals;

said first filtered-signal data stream comprises on-time samples of said filtered signal stream, each of said on-time samples occurring substantially coincidentally with said passage of said filtered signal locus proximate one of said phase points of said phase-point constellation; and said second filtered-signal data stream comprises off-time samples of said filtered signal stream wherein each of said off-time samples occurs between adjacent ones of said on-time samples.

27. A digital-communications transmitter circuit as claimed in claim 26 wherein each of said off-time samples occurs substantially midway between adjacent ones of said on-time samples.

28. A digital-communications transmitter circuit as claimed in claim [23] *24* additionally comprising an interleaver coupled to said binary data source and configured to provide an interleaved signal stream.

29. A digital-communications transmitter circuit as claimed in claim [23] *24* wherein said constellation is an amplitude and phase shift keying constellation.

*30. A digital communications transmitter circuit as claimed in claim 6 wherein:*

*said filtered signal stream is a stream of complex digital values, with each of said complex digital values exhibiting a peak magnitude component; and*

*said constrained-envelope generator is configured to determine when ones of said peak magnitude components exceed a threshold value.*

*31. A digital communications transmitter circuit as claimed in claim 30 wherein:*

*said transmitter circuit additionally comprises a phase mapper coupled to said pulse-spreading filter and configured to select said digitized quadrature phase points from a phase-point constellation, said phase-point constellation having a maximum magnitude phase point; and*

*said threshold value is a magnitude value approximately equal to a magnitude of said maximum-magnitude phase point.*

*32. A digital communications transmitter circuit as claimed in claim 31 additionally comprising an interleaver coupled to said phase mapper.*

*33. A constrained-envelope digital communications transmitter circuit comprising:*

*a pulse-spreading filter configured to receive a quadrature phase-point signal stream of digitized quadrature phase points and produce a filtered signal stream, said filtered signal stream exhibiting energy corresponding to each phase point spread throughout a plurality of unit baud intervals;*

*a constrained-envelope generator coupled to said pulse-spreading filter and configured to produce a constrained-bandwidth error signal stream;*

*a combining circuit coupled to said pulse-spreading filter and to said constrained envelope generator, said combining circuit configured to combine said filtered signal stream and said constrained-bandwidth error signal stream to produce a constrained envelope signal stream;*

*a substantially linear amplifier having an input coupled to said combining circuit and having an output; and*

*a delay element coupled between said pulse-spreading filter and said combining circuit;*

*wherein:*

*said constrained-envelope generator is an off-time constrained-envelope generator;*

*said constrained-bandwidth error signal stream is an off-time constrained bandwidth error signal stream;*

*said transmitter circuit additionally comprises an on-time constrained-envelope generator coupled to said pulse-spreading filter and configured to produce an on-time constrained-bandwidth error signal stream; and*

*said combining circuit is coupled to said pulse-spreading filter, to said off-time constrained-envelope generator, and to said on-time constrained-envelope generator, and said combining circuit is configured to combined said filtered signal stream, said off-time constrained-bandwidth error signal stream, and said on-time constrained bandwidth error signal stream to produce said constrained-envelope signal stream.*

*34. In a digital communications system, a method for the transmission of a constrained-envelope communications signal, said transmission method comprising the steps of:*

*filtering a quadrature phase-point signal stream to produce a filtered signal stream, said filtering step spreading energy from each phase point in said filtered signal stream over a plurality of unit baud intervals;*

*delaying said filtered signal streams;*

*generating a constrained-bandwidth error signal stream from said filtered signal stream and a threshold signal;*

*combining said filtered signal stream and said constrained-bandwidth error signal stream to produce a constrained-envelope signal stream;*

*linearly amplifying said constrained-envelope signal stream to produce said constrained-envelope communications signal; and*

*transmitting said constrained-envelope communications signal;*

*wherein:*

*said filtering step comprises the step of receiving one quadrature phase point per unit baud interval;*

*said filtering step additionally comprises the step of producing two complex samples of said filtered signal stream per unit baud interval;*

*said generating step comprises the step of evaluating one of said two complex samples of said filtered signal*

*stream per unit baud interval to produce an error signal stream having one error pulse per unit baud interval; and*

*said generating step additionally comprises the step of filtering said error signal stream to produce said constrained-bandwidth error signal stream having two complex samples of said constrained-bandwidth error signal stream per unit baud interval.*

*35. A transmission method as claimed in claim 34 wherein said generating step additionally comprises the steps of:*

*providing said threshold signal; and*

*determining when ones of peak magnitude components of a stream of complex digital values of said filtered signal stream exceed a threshold value of said threshold signal.*

*36. A transmission method as claimed in claim 34 wherein:*

*said filtered signal stream includes two or more complex digital values per unit baud interval, said complex digital values in said filtered signal stream exhibiting local peak magnitudes; and*

*said generating step is configured so that said constrained-bandwidth error signal stream includes two or more complex values per unit baud interval, said complex values in said constrained-bandwidth error signal stream being responsive to said local peak magnitudes of said filtered signal stream so as to spread energy from selected ones of said local peak magnitudes over a plurality of unit baud intervals of said constrained bandwidth error signal stream.*

*37. A transmission method as claimed in claim 34 wherein said transmitting step continuously transmits said constrained-envelope communications signal.*

*38. A transmission method as claimed in claim 34 wherein said combining step comprises the step of reducing a peak magnitude component of said filtered signal stream.*

*39. A transmission method as claimed in claim 34 wherein:*

*said generating step comprises the step of filtering an error signal stream having one error pulse per unit baud interval to produce said constrained-bandwidth error signal stream, said step of filtering an error signal spreading energy from each error pulse in said error signal stream over a plurality of unit baud intervals;*

*said step of delaying said filtered signal stream comprises producing a delayed signal stream; and*

*said combining step combines said delayed signal stream and said constrained bandwidth error signal stream to produce said constrained-envelope signal stream.*

* * * * *

UNITED STATES PATENT AND TRADEMARK OFFICE

CERTIFICATE OF CORRECTION

PATENT NO. : RE41,380 E
APPLICATION NO. : 10/718507
DATED : June 15, 2010
INVENTOR(S) : Ronald D. McCallister et al.

It is certified that error appears in the above-identified patent and that said Letters Patent is hereby corrected as shown below:

In the Specification

Column 1, line 9, above the heading, "TECHNICAL FIELD OF THE INVENTION" insert: -- Notice: More than one reissue application has been filed for the reissue of patent 6,104,761. The reissue applications are application numbers 12/814,529, and 10/718,507(the present application), now US RE41380. Application number 12/814,529 is a continuation reissue of application number 10/718,507, and said application number 10/718,507 is an application for reissue of US Patent Number 6,104,761, now RE41380. Both of these reissue applications are reissues of the same US Patent No. 6,104,761. --

Signed and Sealed this
Seventeenth Day of September, 2013

Teresa Stanek Rea

Teresa Stanek Rea
*Deputy Director of the United States Patent and Trademark Office*